(12) United States Patent
Lai et al.

(10) Patent No.: US 8,892,912 B2
(45) Date of Patent: Nov. 18, 2014

(54) ADAPTIVE USB CHARGING METHOD AND SYSTEM

(75) Inventors: Yi-Lin Lai, New Taipei (TW); Bo-Ming Huang, New Taipei (TW); Kuo-Yu Wu, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 641 days.

(21) Appl. No.: 13/100,110

(22) Filed: May 3, 2011

(65) Prior Publication Data

US 2012/0210146 A1   Aug. 16, 2012

(30) Foreign Application Priority Data

Feb. 11, 2011 (TW) .............................. 100104508 A (51) Int. Cl.
*G06F 1/26* (2006.01)
(52) U.S. Cl.
CPC ..................................... *G06F 1/266* (2013.01)
USPC ........................................................ 713/300
(58) Field of Classification Search
USPC ........................................................ 713/300
See application file for complete search history.

(56) References Cited

U.S. PATENT DOCUMENTS

| | | | | |
|---|---|---|---|---|
| 7,694,032 | B2 * | 4/2010 | Lim et al. | 710/14 |
| 7,975,091 | B2 * | 7/2011 | Uchida | 710/313 |
| 8,200,852 | B2 * | 6/2012 | Liu et al. | 710/4 |
| 8,358,100 | B2 * | 1/2013 | Helfrich | 320/106 |
| 2009/0184688 | A1 | 7/2009 | Kim et al. | |
| 2010/0219790 | A1 | 9/2010 | Chadbourne et al. | |

FOREIGN PATENT DOCUMENTS

| | | |
|---|---|---|
| CN | 101546918 A | 9/2009 |
| TW | 200625070 A | 7/2006 |

OTHER PUBLICATIONS

Battery Charging Specification, rev. 1.1. Apr. 15, 2009.*

* cited by examiner

*Primary Examiner* — Paul Yanchus, III
*Assistant Examiner* — Eric Chang
(74) *Attorney, Agent, or Firm* — Donald E. Stout; Stout, Uxa & Buyan, LLP (57) ABSTRACT

An adaptive universal serial bus (USB) charging method and system are disclosed. In a low-power state, a USB device is charged with a non-USB charging mode. The non-USB charging mode is retained when no variation of a data signal coupled to the USB device is detected. When the data signal possesses variation for a first period, it is switched to a third proprietary charging mode.

24 Claims, 5 Drawing Sheets

ADAPTIVE USB CHARGING METHOD AND SYSTEM

CROSS-REFERENCE TO RELATED APPLICATIONS

The entire contents of Taiwan Patent Application No. 100104508, filed on Feb. 11, 2011, from which this application claims priority, are incorporated herein by reference.

BACKGROUND OF THE INVENTION

1. Field of the Invention

The present invention generally relates to Universal Serial Bus (USB), and more particularly to an adaptive USB charging method and system.

2. Description of Related Art

According to Universal Serial Bus (USB) specification, a USB device connected to a host can sink at most 500 mA. Some USB devices even sink current from USB ports of a host (such as a personal computer) to charge the USB devices. Accordingly, charging regulations, such as Battery Charging Specification or APPLE USB Power Adaptor, are drafted to govern the device charging.

However, a conventional USB device can select only one USB charging mode to perform charging when the computer is in a hibernation mode or is shut down. When the USB device is removed and is replaced with another USB device supporting another USB charging mode, the replacing USB device either is incapable of being charged or just continues using the preceding USB charging mode.

Moreover, a conventional USB charging circuit is commonly manufactured as an external circuit. In other words, a user has to buy an extra USB charger, which increases expenses and causes inconvenience.

For the foregoing reasons, a need has arisen to propose a novel USB charging scheme for not only resolving unchangeable charging mode or unchargeability as mentioned above, but also decreasing circuit area.

SUMMARY OF THE INVENTION

In view of the foregoing, an embodiment of the present invention provides an adaptive USB charging method and system to make USB devices detectable when they return to a normal-power state. Moreover, when the USB device according to the embodiment enters a low-power state, another USB device being inserted to replace the preceding USB device can be adaptively charged in a supported USB charging mode. Further, the charging system according to the embodiment may be integrated with a host, thereby saving circuit area and associated manufacturing cost.

According to one embodiment, a USB device is charged according to a non-USB charging mode in a low-power state. When no variation on a data signal coupled to the USB device is detected, the non-USB charging mode is retained. When variation on the data signal for a first period is detected, it is switched to a third proprietary charging mode.

DETAILED DESCRIPTION OF THE INVENTION

Figure 1:
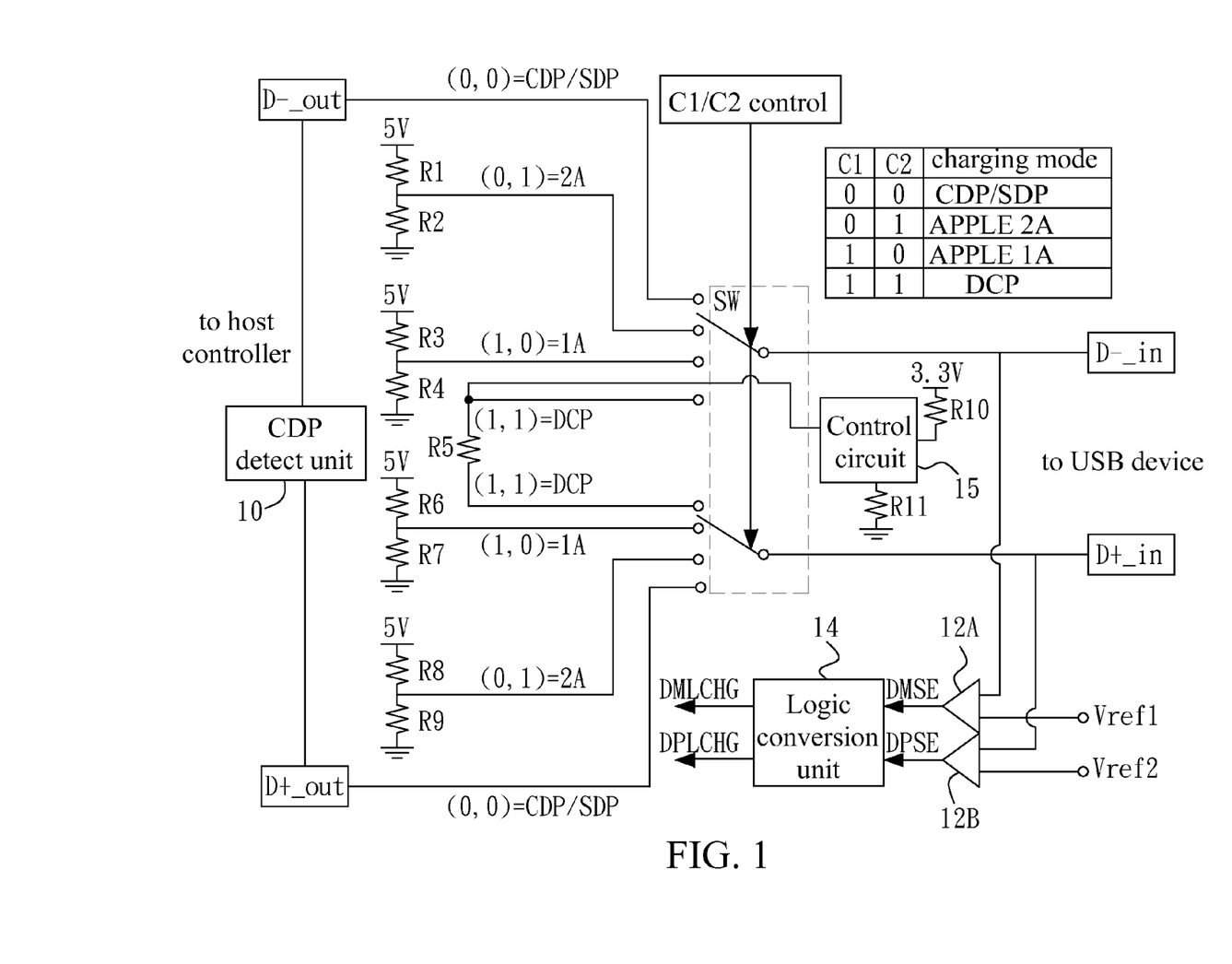
FIG. 1 shows an adaptive Universal Serial Bus (USB) charging system according to one embodiment of the present invention.
Figure 2:
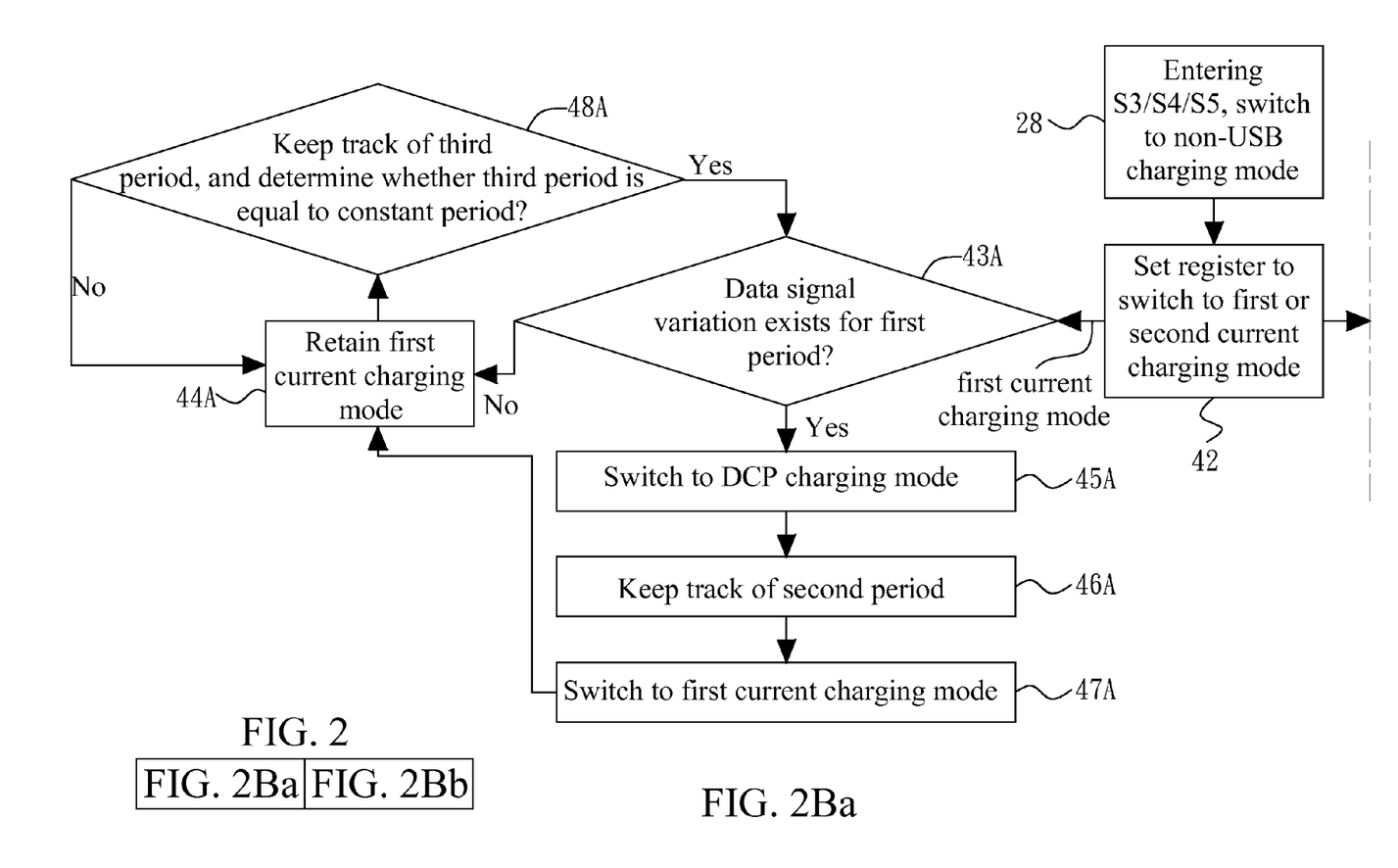
FIG. 2A and FIG. 2B show flow diagrams of a USB charging method according to one embodiment of the present invention.
Figure 2A:
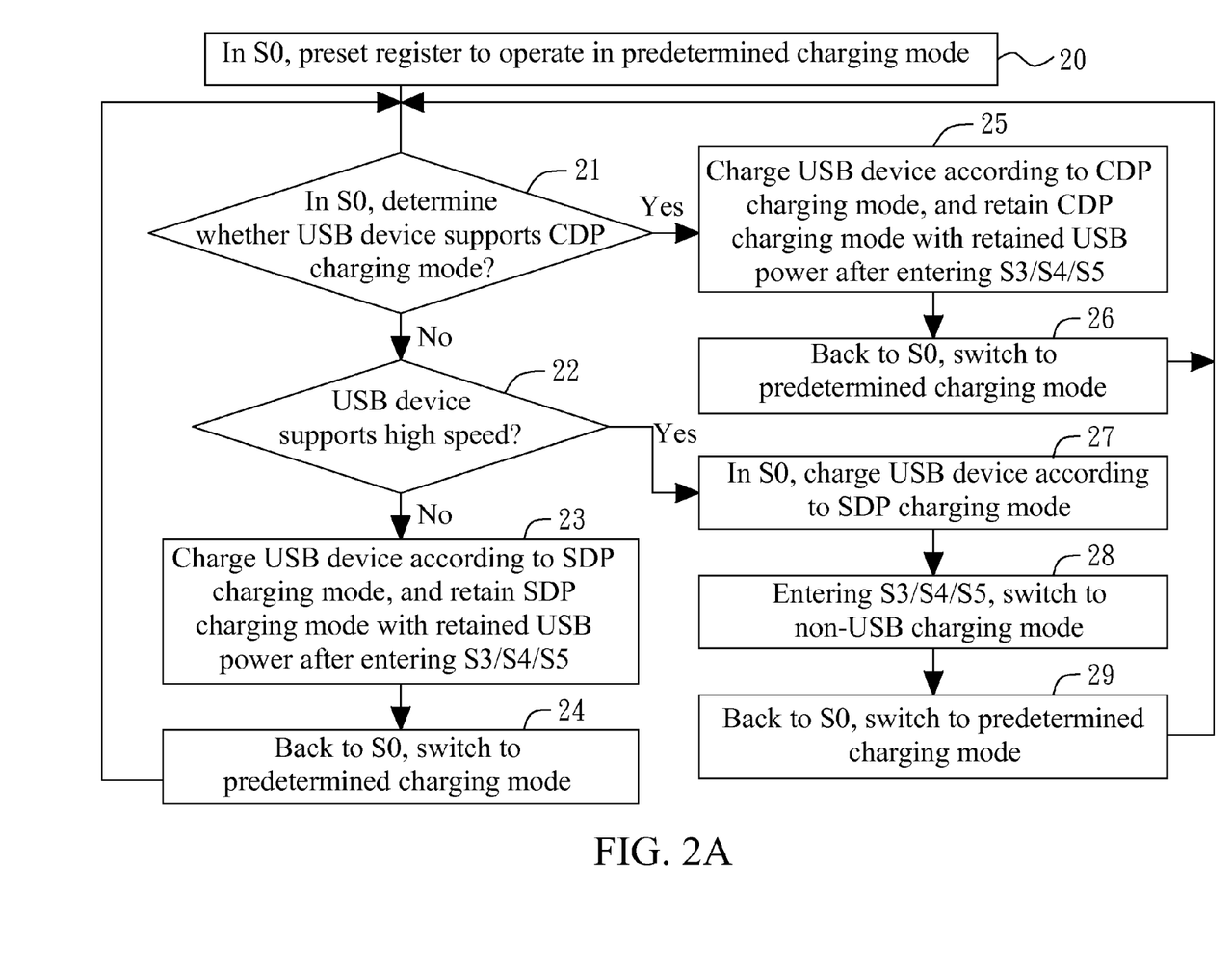

FIG. 1 shows an adaptive Universal Serial Bus (USB) charging system according to one embodiment of the present invention. FIG. 2A and FIG. 2B show flow diagrams of a USB charging method according to one embodiment of the present invention. The charging system of the embodiment may be either integrated with or independent of a host. One advantage of integrating the charging system with the host is to share a controller (not shown) with the host, thereby saving circuit area and associated manufacturing cost. The embodiment may be adapted to various USB standards such as USB 3.0. Moreover, the host mentioned in this specification may generally refer to other devices such as a hub. The power states discussed below may refer to S0, S3, S4 and S5 defined in, but not limited to, Advanced Configuration and Power Interface (ACPI), the disclosure of which is hereby incorporated by reference. Specifically, S0 indicates a working state, S3 indicates a standby state, S4 indicates a hibernation state, and S5 indicates a soft off state. The S3, S4 and S5 may be collectively called a low-power state, and S0 may be called a normal-power state.

In the embodiment, the USB charging system includes a pair of differential data inputs: a positive data input D+_in and a negative data input D−_in, which may be respectively coupled to a positive data input pin and a negative data input pin of a USB device. The USB charging system also includes a pair of differential data outputs: a positive data output D+_out and a negative data output D−_out, which may be coupled to a host. The embodiment includes four charging modes: a standard downstream port (SDP) charging mode, a charging downstream port (CDP) charging mode, a dedicated charging port (DCP) charging mode and a non-USB charging mode. Specifically, the SDP charging mode, the CDP charging mode and the DCP charging mode are defined in Battery Charging Specification, the disclosure of which is hereby incorporated, by reference; and the non-USB charging mode is not defined in Battery Charging Specification. In one embodiment, the non-USB charging mode is an APPLE charging mode, which is defined in APPLE USB Power Adaptor, the disclosure of which is hereby incorporated by reference. A two-bit register C1/C2 may, but unnecessarily, be used to control a switch SW to select one of the charging modes. In one embodiment, firmware in host controller (not shown) sets the values C1 and C2 in the two-bit register to adaptively switch the charging mode.

The four charging modes are specifically discussed below. (1) In the SDP charging mode, the differential data inputs D+_in/D−_in are coupled to the differential data outputs D+_out/D−_out respectively. In the SDP charging mode, USB data transfer and USB charging (with maximum charging current of 500 mA) may be performed at the same time. (2) In the CDP charging mode, the differential data inputs D+_in/D−_in are coupled to the differential data outputs D+_out/D−_out respectively. In the CDP charging mode, USB data transfer and USB charging (with maximum charging current of 1.5 A) may be performed at the same time. The CDP charging mode differs from the SDP charging mode on the capability of detecting the CDP charging mode based on handshaking scheme using a CDP detect unit 10 in the CDP charging mode. (3) In the DCP charging mode, the differential data inputs D+_in/D−_in are disconnected to the differential data outputs D+_out/D−_out respectively, but coupled to a resistor R5. In the DCP charging mode, only USB charging, but not USB data transfer, may be performed. (4) The non-USB charging mode (e.g., a charging mode with respect to APPLE devices) includes a first current charging mode and a second current charging mode. The former one (e.g., APPLE 1A charging mode) has a charging current up to 1A, and the latter one (e.g., APPLE 2A charging mode) has a charging current up to 2A. In the non-USB charging mode, the differential data inputs D+_in/D−_in are disconnected to the differential data outputs D+_out/D−_out respectively, but coupled to specific voltage dividers respectively. Specifically speaking, in the first current charging mode, a voltage divider R6/R7 provides 2.0V to the positive data input D+_in, and a voltage divider R3/R4 provides 2.7V to the negative data input D−_in; in the second current charging mode, a voltage divider R8/R9 provides 2.7V to the positive data input D+_in, and a voltage divider R1/R2 provides 2.0V to the negative data input D−_in.

According to the embodiment as exemplified in, but not limited to, FIG. 1, when C1 and C2 are "0", the charging mode may be the CDP charging mode or the SDP charging mode. When C1 is "0" and C2 is "1", the charging mode may be the non-USB charging mode with a first charging current. When C1 is "1" and C2 is "0", the charging mode may be the non-USB charging mode with a second charging current. When C1 and C2 are "1", the charging mode may be the DCP charging mode.

Referring to FIG. 2A, in a normal-power state S0, the C1 and C2 values of the two-bit register are preset to operate in a predetermined charging mode (step 20). In one embodiment, the differential data inputs D+_in/D−_in are coupled to the differential data outputs D+_out/D−_out respectively, and USB data transfer and USB charging may be performed at the same time (e.g., in a charging mode when C1 and C2 are "0"). Subsequently, according to the embodiment, in the normal-power state S0, the CDP detect unit 10 (FIG. 1) is used to determine whether the USB device supports the CDP charging mode (step 21). If it is determined that the CDP charging mode is supported, the USB device is charged, in step 25, according to the CDP charging mode, which is retained with retained USB power VBUS after entering S3/S4/S5 state. When the power state goes back to the normal-power state S0 from the low-power state S3/S4/S5, it is switched to the predetermined charging mode (step 26).

If it is determined in step 21 that the USB device does not support the CDP charging mode, it is determined in step 22 whether the USB device supports high-speed or even higher speed (e.g., super-speed). If it is determined that the USB device does not support high-speed or even higher speed, that is, supporting low-speed or full-speed, the USB device is charged, in step 23, according to the SDP charging mode, which is retained with retained USB power VBUS after entering S3/S4/S5 state. When the power state goes back to the normal-power state S0 from the low-power state S3/S4/S5, it is switched to the predetermined charging mode (step 24). The flow returns to step 21.

If it is determined in step 22 that the USB device supports high-speed or even higher speed, the USB device is charged, in step 27, according to the SDP charging mode. In step 28, when the power state enters the low-power state S3/S4/S5 from the normal-power state S0, it is switched to a non-USB charging mode. In one embodiment, before or concurrently with switching to the non-USB charging mode, the USB power VBUS is disconnected for a period (e.g., one second) and is reconnected. Details about disconnecting and reconnecting the USB power will be described later. When the power state goes back to the normal-power state S0 from the low-power state S3/S4/S5, it is switched to the predetermined charging mode (step 29).

According to the flow as shown in FIG. 2A, with respect to the USB device supporting low-speed, full-speed or the CDP charging mode, when the power state enters the low-power state S3/S4/S5 from the normal-power state S0, the USB charging mode need not be switched and the USB power need not be disconnected; the USB device can still be detected after going back to the normal-power state S0. On the other hand, with respect to the USB device supporting high-speed or even higher speed but not the CDP charging mode, when the power state enters the low-power state S3/S4/S5 from the normal-power state S0, the USB charging mode need be switched and the USB power need be disconnected and reconnected.

In the embodiment, as shown in FIG. 2B, after switching to the non-USB charging mode (step 28), the firmware of a host controller (not shown) sets the values C1 and C2 of the two-bit register in step 42, such that one of the first current charging mode (or called a first proprietary charging mode in this specification) and the second current charging mode (or called a second proprietary charging mode) is selectively switched to charge a connected device. Subsequently, in step 43A or 43B, the signal on the differential data inputs D+_in/D−_in is detected to determine whether variation exists for a first period. In the embodiment, the detection on the differential data inputs D+_in/D−_in is performed using a first comparator 12A (FIG. 1) to compare the negative data input D−_in and a first reference voltage Vref1 to generate a first comparison result DMSE; and a second comparator 12B to compare the positive data input D+_in and a second reference voltage Vref2 to generate a second comparison result DPSE. Afterwards, a logic conversion unit 14 converts the first comparison result DMSE and the second comparison result DPS into two digital logic values DMLCHG and DPLCHG, which may be stored in a register. The firmware of the controller then determines whether signal variation on the differential data inputs D+_in/D−_in exists for the first period according to the digital logic values DMLCHG and DPLCHG. For example, state transition on one of the digital logic values DMLCHG and DPLCHG indicates signal variation on the differential data inputs D+_/D−_in. If no signal variation exists, the first or second current charging mode is retained (step 44A or 44B). The first comparator 12A, the second comparator 12B and the logic conversion unit 14 are collectively called a detect unit. In one embodiment, the detect unit includes at least two comparators for determining variation range of the differential data inputs D+_in/D−_n, and the logic conversion unit 14 is utilized to convert at least one digital logic value for later use.

Figure 3:
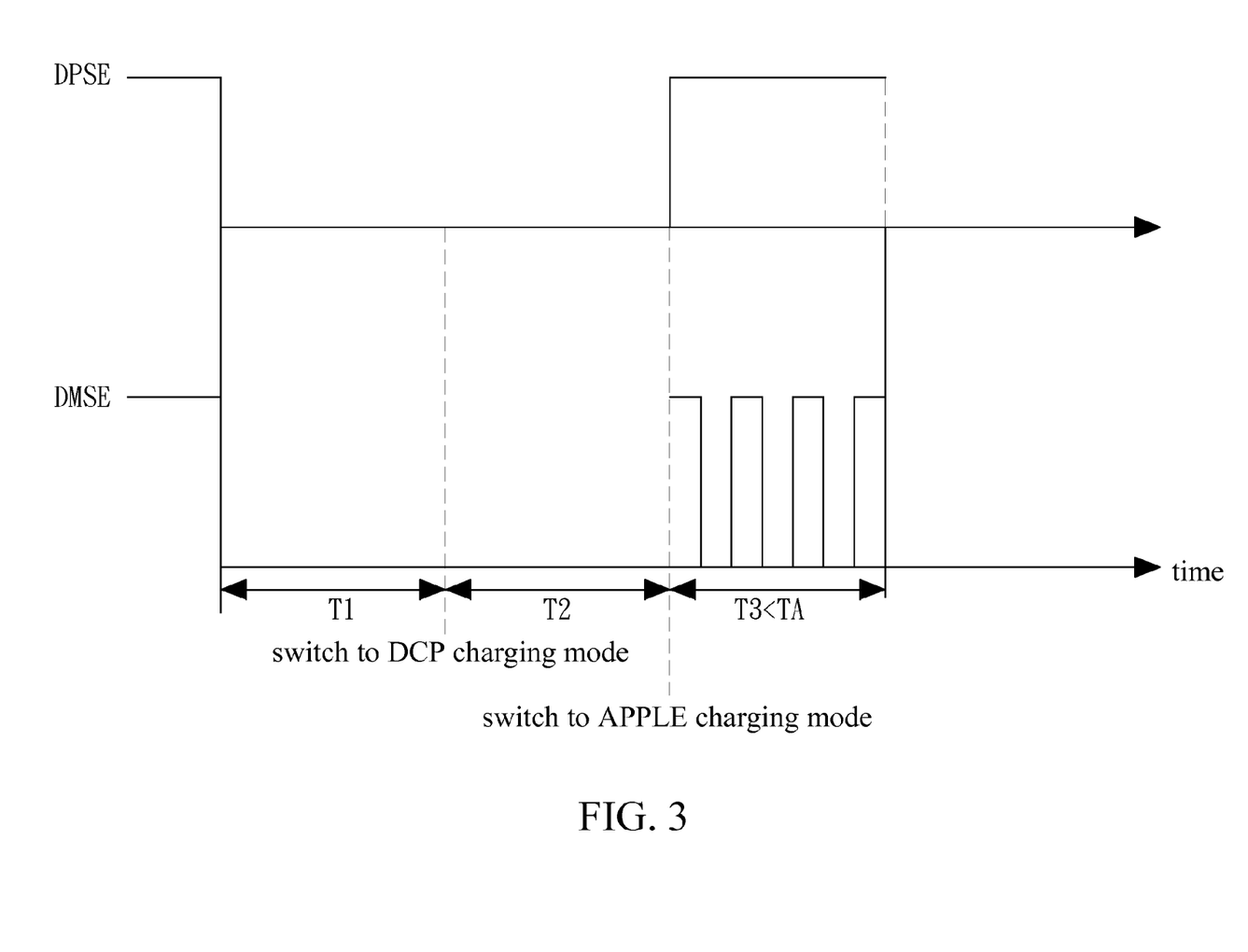
FIG. 3 schematically illustrates the signals DPSE and DMSE of FIG. 1.

Referring to FIG. 3, the signals DPSE and DMS of FIG. 1 are schematically illustrated. If it is determined in step 43A or 43B that signal variation exists on the differential data inputs D+_in/D−_in for the first period (e.g., T1), indicating one of DPSE and DMSE has state transition (e.g., low level), the digital logic values DMLCHG and DPLCHG are cleared in step 45A or 45B, and it is switched to the DCP charging mode (or called a third proprietary charging mode in this specification). Subsequently, in step 46A or 46B, the controller keeps track of a second period (e.g., T2) and, in step 47A or 47B, it is switched to the first or second current charging mode at the end of the second period. At the same time, as the USB power VBUS is retained, the USB device may be continuously charged after going back to the first or second current charging mode at the end of the second period. The flow proceeds to step 44A or 44B, in which the first or second current charging mode is retained. Afterwards, in step 48A or 48B, a third period (e.g., T3) is kept track to determine whether the third period is equal to a predetermined period. If the third period is determined to be the predetermined period, perform step 43A or 43B to detect signal variation on the differential data inputs D+_in/D−_in for the first period (e.g., T1); otherwise, perform step 44A or 44B. The first period, the second period, the third period and the predetermined period of the embodiment may be programmed according to specific applications.

According to the flow illustrated in FIG. 2B, when a connected USB device supports the DCP charging mode and the USB device is not removed, the differential data inputs D+_in/D−_in possesses variation, in step 48A or 48B, such as T3 exemplified in FIG. 3. As the third period is kept track, the first or second current charging mode is retained to prevent from frequently switching among charging modes, when the third period is less than a predetermined period. When the third period is equal to the predetermined period, the flow returns to step 43A or 43B. As the USB power VBUS is not disconnected, the connected device can still be charged by the charging system. In one embodiment, when the USB device removed, the flow returns to step 43A or 43B after the predetermined period elapses, and it is therefore capable of detecting whether the USB device is removed. In one example according to the flow of FIG. 2B, in the low-power state S3/S4/S5, the USB device is removed and replaced with another USB device supporting the first or second current charging mode, the USB device may be switched to the first or second current charging mode in step 47A or 47B and is then subject to charging. In another example according to the flow of FIG. 2B, in the low-power state S3/S4/S5, if the USB device is removed and replaced with another USB device supporting the DCP charging mode, the signal variation of the differential data inputs D+_in/D−_in is detected in step 43A or 43B, and the USB device may be switched to the DCP charging mode in step 45A or 45B and is then subject to charging. In a simplified embodiment, the flow of the present invention may omit steps 48A and 48B, such that steps 44A and 44B go directly to steps 43A and 43B respectively. In other words, when entering the low-power state S3/S4/S5, if the USB device is removed and is replaced with another USB device, the USB device may be adaptively switched to a supporting charging mode and is then subject to charging.

Referring back to FIG. 2A, when the power state goes back to the normal-power state S0 from the low-power state S3/S4/S5 (step 29), it is switched back to the predetermined charging mode (e.g., a charging mode when C1 and C2 are "0"). Before or concurrently with switching the charging mode, the USB power VBUS is disconnected for a period (e.g., one second) and is reconnected. The flow then goes back to step 21, in which USB data transfer and USB charging may be performed at the same time in the predetermined charging mode.

Moreover, when a USB device supporting the DCP charging mode is coupled to the charging system in step 45A/45B, a physical circuit may be devised to detect the removal of the USB device and then switch to the non-USB charging mode. In other words, step 46A/46B may be omitted without waiting for the second period. Accordingly, the charging mode may be fast switched in this case.

Specifically speaking, referring to FIG. 1, a USB device supporting the DCP charging mode is coupled to the charging system. When the switch SW switches to the DCP charging mode (i.e., step 45A/45B), a control circuit 15 detects the voltage level of the differential data inputs D+_in/D−_in, according to which a pull-high resistor or a pull-low resistor is coupled to one end of the differential data inputs D+_in/ D−_in. When a USB device supporting the DCP charging mode is coupled to the charging system, one of the following two situations occurs.

In one embodiment, in the DCP charging mode, the control circuit 15 controls to couple a pull-low resistor to one end of the high-level differential data inputs D+_in/D−_in. If the USB device is not removed, the pull-low resistor will not affect the charging; if the USB device is removed, the pull-low resistor pulls the differential data inputs D+_in/D−_in down to a reference voltage (e.g., ground). In other words, when the USB device is removed, the differential data inputs D+_in/D−_in have state transition from high-level to low-level. Upon detecting the state transition by the detect unit, the charging system switches to the non-USB charging mode.

In another embodiment, in the DCP charging mode, the control circuit 15 controls to couple a pull-high resistor to one end of the low-level differential data inputs D+_in/D−_in. If the USB device is not removed, the pull-high resistor will not affect the charging; if the USB device is removed, the pull-high resistor pulls the differential data inputs D+_in/D−_in up to a high-level voltage e.g., 3.3V). In other words, when the USB device is removed, the differential data inputs D+_in/ D−_in have state transition from low-level to high-level. Upon detecting the state transition by the detect unit, the charging system switches to the non-USB charging mode.

Accordingly, in the DCP charging mode, the charging system may detect the removal of the USB device, and then fast switch to the non-USB charging mode.

Although specific embodiments have been illustrated and described, it will be appreciated by those skilled in the art that various modifications may be made without departing from the scope of the present invention, which is intended to be limited solely by the appended claims.

What is claimed is:

1. An adaptive Universal Serial Bus (USB) charging method, comprising:
   charging a USB device according to a non-USB charging mode in a low-power state;
   retaining the non-USB charging mode when no variation on a data signal coupled to the USB device is detected;
   switching to a third proprietary charging mode when variation on the data signal for a first period is detected; and
   keeping track of a second period and then switching to the non-USB charging mode in the third proprietary charging mode;
   wherein the data signal is from a positive data input pin and a negative data input pin of the USB device.

2. The method of claim 1, further comprising:
   directly switching to the non-USB charging mode when removal of the USB device is detected in the third proprietary charging mode.

3. The method of claim 2, further comprising:
   detecting a voltage level of the data signal, according to which a pull-high resistor or a pull-low resistor is controllably coupled to the data signal; and
   detecting state transition on the data signal to determine the removal of the USB device.

4. The method of claim 1, further comprising:
   setting a register to switch the non-USB charging mode to a first proprietary charging mode or a second proprietary charging mode, and then subjecting the USB device to charging, wherein a charging current of the first proprietary charging mode is different from a charging current of the second proprietary charging mode.

5. The method of claim 1, further comprising:
   keeping track of a third period after switching to the non-USB charging mode, and continuously detecting the variation on the data signal for the first period when the third period is equal to a predetermined period.

6. The method of claim 4, wherein the first proprietary charging mode and the second proprietary charging mode are a first current charging mode and a second current charging mode, respectively, defined in APPLE USB Power Adaptor, and the third proprietary charging mode is a dedicated charging port (DCP) charging mode defined in Battery Charging Specification.

7. The method of claim 1, wherein the variation on the data signal is detected by:
   comparing a positive data signal and a first reference signal, thereby generating a first comparison result;
   comparing a negative data signal and a second reference signal, thereby generating a second comparison result; and
   converting the first comparison result and the second comparison result to two digital logic values, and determining the variation on the data signal according to state transition on one of the two digital logic values;
   wherein the data signals include the positive data signal and the negative data signal.

8. The method of claim 1, further comprising:
   when going back to a normal-power state from the low-power state, switching to a predetermined charging mode, and disconnecting a USB power for a period and then reconnecting the USB power, followed by entering the normal-power state, wherein the USB device performs USB data transfer and USB charging at the same time in the predetermined charging mode.

9. The method of claim 8, wherein the low-power state is a state S3, S4 or S5 defined in Advanced Configuration and Power Interface (ACPI), wherein the state S3 indicates a standby state, the state S4 indicates a hibernation state, and the state S5 indicates a soft off state; wherein the normal-power state is a state S0 defined in ACPI to indicate a working state.

10. The method of claim 1, further comprising:
    charging the USB device according to a charging downstream port (CDP) charging mode when the USB device is detected to support the CDP charging mode in a normal-power state;
    retaining the CDP charging mode and a USB power when entering the low-power state from the normal-power state; and
    switching to a predetermined charging mode when entering the normal-power state from the low-power state.

11. The method of claim 1, further comprising:
    determining whether the USB device supports a high speed or a speed higher than the high speed, when the USB device is detected not to support a charging downstream port (CDP) charging mode in a normal-power state;
    charging the USB device according to a standard downstream port (SDP) charging mode if the USB device is determined not to support the high speed or the speed higher than the high speed;
    retaining the SDP charging mode and a USB power when entering the low-power state from the normal-power state; and
    switching to a predetermined charging mode when entering the normal-power state from the low-power state.

12. The method of claim 1, further comprising:
    determining whether the USB device supports a high speed or a speed higher than the high speed, when the USB device is detected not to support a charging downstream port (CDP) charging mode in a normal-power state;
    charging the USB device according to a standard downstream port (SDP) charging mode if the USB device is determined to support the high speed or the speed higher than the high speed; and
    when entering the low-power state from the normal-power state, switching to the non-USB charging mode, and disconnecting a USB power for a period and then reconnecting the USB power, followed by entering the low-power state.

13. An adaptive Universal Serial Bus (USB) charging system, comprising:
    a controller configured to charge a USB device according to a non-USB charging mode in a low-power state; and
    a detect unit configured to detect variation on a data signal coupled to the USB device;
    wherein the controller retains the non-USB charging mode when the detect unit detects no variation on the data signal coupled to the USB device; the controller controls a switch to switch to a third proprietary charging mode when the detect unit detects variation on the data signal for a first period;
    wherein the data signal is from a positive data input pin and a negative data input pin of the USB device, and wherein the controller controls the switch to switch to the non-USB charging mode when a second period elapses.

14. The system of claim 13, wherein the controller directly switches to the non-USB charging mode when the detect unit detects removal of the USB device in the third proprietary charging mode.

15. The system of claim 14, further comprising:
    a control circuit configured to controllably couple a pull-high resistor or a pull-low resistor to the data signal according to a voltage level of the data signal detected by the detect unit;
    wherein the detect unit detects state transition on the data signal to determine the removal of the USB device.

16. The system of claim 13, wherein the controller sets a register to switch the non-USB charging mode to a first proprietary charging mode or a second proprietary charging mode, and accordingly charges the USB device, wherein a charging current of the first proprietary charging mode is different from a charging current of the second proprietary charging mode.

17. The system of claim 13, wherein the controller keeps track of a third period after switching to the non-USB charging mode, and continuously detects the variation on the data signal for the first period when the third period is equal to a predetermined period.

18. The system of claim 16, wherein the first proprietary charging mode and the second proprietary charging mode are a first current charging mode and a second current charging mode, respectively, defined in APPLE USB Power Adaptor, and the third proprietary charging mode is a dedicated charging port (DCP) charging mode defined in Battery Charging Specification.

19. The system of claim 13, wherein the detect unit comprises:
    a first comparator configured to compare a positive data signal and a first reference signal, thereby generating a first comparison result;
    a second comparator configured to compare a negative data signal and a second reference signal, thereby generating a second comparison result; and
    a logic conversion unit configured to convert the first comparison result and the second comparison result to two digital logic values, and determine the variation on the data signal according to the two digital logic values;

wherein the data signals include the positive data signal and the negative data signal.

20. The system of claim 13, further comprising:
when going back to a normal-power state from the low-power state, switching to a predetermined charging mode by the switch, and disconnecting a USB power for a period and then reconnecting the USB power, followed by entering the normal-power state, wherein the USB device performs USB data transfer and USB charging at the same time in the predetermined charging mode.

21. The system of claim 20, wherein the low-power state is a state S3, S4 or S5 defined in Advanced Configuration and Power Interface (ACPI), wherein the state S3 indicates a standby state, the state S4 indicates a hibernation state, and the state S5 indicates a soft off state; wherein the normal-power state is a state S0 defined in ACPI to indicate a working state.

22. The system of claim 13, further comprising:
a charging downstream port (CDP) detect unit configured to detect a CDP charging mode, wherein the USB device is charged according to the CDP charging mode when the USB device is detected to support the CDP charging mode in a normal-power state;
wherein the CDP charging mode and a USB power are retained when entering the low-power state from the normal-power state; and
switching to a predetermined charging mode when entering the normal-power state from the low-power state.

23. The system of claim 13, further comprising:
a charging downstream port (CDP) detect unit configured to detect a CDP charging mode, wherein the USB device is determined whether to support a high speed or a speed higher than the high speed, when the USB device is detected not to support a charging downstream port (CDP) charging mode in a normal-power state; the USB device is charged according to a standard downstream port (SDP) charging mode if the USB device is determined not to support the high speed or the speed higher than the high speed;
wherein the SDP charging mode and a USB power are retained when entering the low-power state from the normal-power state; and
switching to a predetermined charging mode when entering the normal-power state from the low-power state.

24. The system of claim 13, further comprising:
a charging downstream port (CDP) detect unit configured to detect a CDP charging mode, wherein the USB device is determined whether to support a high speed or a speed higher than the high speed, when the USB device is detected not to support a charging downstream port (CDP) charging mode in a normal-power state; the USB device is charged according to a standard downstream port (SDP) charging mode if the USB device is determined to support the high speed or the speed higher than the high speed;
wherein the switch is controlled to switch to the non-USB charging mode, and disconnect a USB power for a period and then reconnect the USB power, followed by entering the low-power state, when entering the low-power state from the normal-power state.

* * * * *